United States Patent
Zhang et al.

(10) Patent No.: US 11,594,971 B2
(45) Date of Patent: Feb. 28, 2023

(54) CONTROL CIRCUIT AND CONTROL METHOD FOR SWITCHING REGULATOR

(71) Applicant: Nanjing Silergy Micro Technology Co., Ltd., Nanjing (CN)

(72) Inventors: Rui Zhang, Nanjing (CN); Shuai Cheng, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 117 days.

(21) Appl. No.: 17/171,093

(22) Filed: Feb. 9, 2021

(65) Prior Publication Data

US 2021/0296995 A1 Sep. 23, 2021

(30) Foreign Application Priority Data

Mar. 18, 2020 (CN) .......................... 202010191292.7

(51) Int. Cl.
*H02M 3/335* (2006.01)
*H02M 1/08* (2006.01)
*H02M 3/156* (2006.01)

(52) U.S. Cl.
CPC ......... *H02M 3/33507* (2013.01); *H02M 1/08* (2013.01); *H02M 3/156* (2013.01)

(58) Field of Classification Search
None
See application file for complete search history.

(56) References Cited

U.S. PATENT DOCUMENTS

| | | | |
|---|---|---|---|
| 7,227,277 B2 | 6/2007 | Chapman et al. | |
| 7,256,568 B2 | 8/2007 | Lam et al. | |
| 7,936,137 B2 * | 5/2011 | Imanaka | H05B 41/2806 315/354 |
| 7,990,118 B2 * | 8/2011 | Feng | H02M 3/1588 323/271 |
| 8,228,005 B2 * | 7/2012 | Ohtaka | H05B 45/50 315/307 |
| 8,310,846 B2 | 11/2012 | Piazzesi | |
| 8,779,727 B2 * | 7/2014 | Akaho | H02J 7/04 320/141 |
| 8,853,888 B2 | 10/2014 | Khaligh | |
| 9,130,460 B2 | 9/2015 | Sun et al. | |
| 9,257,916 B2 | 2/2016 | Cheng et al. | |
| 9,543,822 B2 | 1/2017 | Hang et al. | |
| 9,559,591 B2 | 1/2017 | Hang et al. | |
| 10,038,377 B2 * | 7/2018 | Ramachandran | H02M 1/36 |
| 10,470,268 B2 * | 11/2019 | Yang | H05B 45/375 |
| 2007/0052397 A1 | 3/2007 | Thompson et al. | |
| 2007/0152647 A1 * | 7/2007 | Liao | H02M 1/32 323/282 |
| 2008/0231115 A1 | 9/2008 | Cho et al. | |
| 2008/0258688 A1 | 10/2008 | Hussain et al. | |

(Continued)

*Primary Examiner* — Jeffrey A Gblende

(57) ABSTRACT

A control circuit for a switching regulator can include: a control signal generation circuit configured to generate a control signal for controlling switching states of power switches in the switching regulator; where, in a first state of the switching regulator, the control signal is generated in accordance with a loop feedback signal that is generated based on a difference between an output voltage and a desired output voltage; and where, in a second state of the switching regulator, the control signal is generated in accordance with a reference voltage by disabling the loop feedback signal.

18 Claims, 4 Drawing Sheets

(56) References Cited

U.S. PATENT DOCUMENTS

| | | |
|---|---|---|
| 2012/0153729 A1 | 6/2012 | Song et al. |
| 2013/0063180 A1 | 3/2013 | Sun et al. |
| 2015/0078045 A1 | 3/2015 | Zhang et al. |
| 2016/0211745 A1 | 7/2016 | Hang et al. |
| 2017/0063238 A1 | 3/2017 | Hang et al. |
| 2017/0279279 A1 | 9/2017 | Shimada et al. |
| 2018/0198361 A1 | 7/2018 | Seong et al. |

* cited by examiner

CONTROL CIRCUIT AND CONTROL METHOD FOR SWITCHING REGULATOR

RELATED APPLICATIONS

This application claims the benefit of Chinese Patent Application No. 202010191292 filed on Mar. 18, 2020, which is incorporated herein by reference in its entirety.

FIELD OF THE INVENTION

The present invention generally relates to the field of power electronics, and more particularly to control circuits and methods for switching regulators.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

The basic principle of an average current mode control is to compare a voltage compensation signal that is obtained according to an output voltage feedback signal and a voltage reference signal, against a sampling signal of an average value of the inductor current, in order to obtain a current compensation signal, and to compare the current compensation signal against a ramp signal in order to obtain a control signal. That is, a dual-loop control may be adopted, and that includes an inner current loop and an outer voltage loop. In dual-loop control, the bandwidth of the inner current loop can be much higher than that of the outer voltage loop, in order to ensure sufficient phase margin. However, under a light load, since the switching frequency may decrease as the load decreases, the bandwidth of the inner current loop may also decrease accordingly. When the bandwidths of the inner and outer loops are relatively close, the phase margin of the system may be reduced, which can lead to poor stability.

Figure 1:
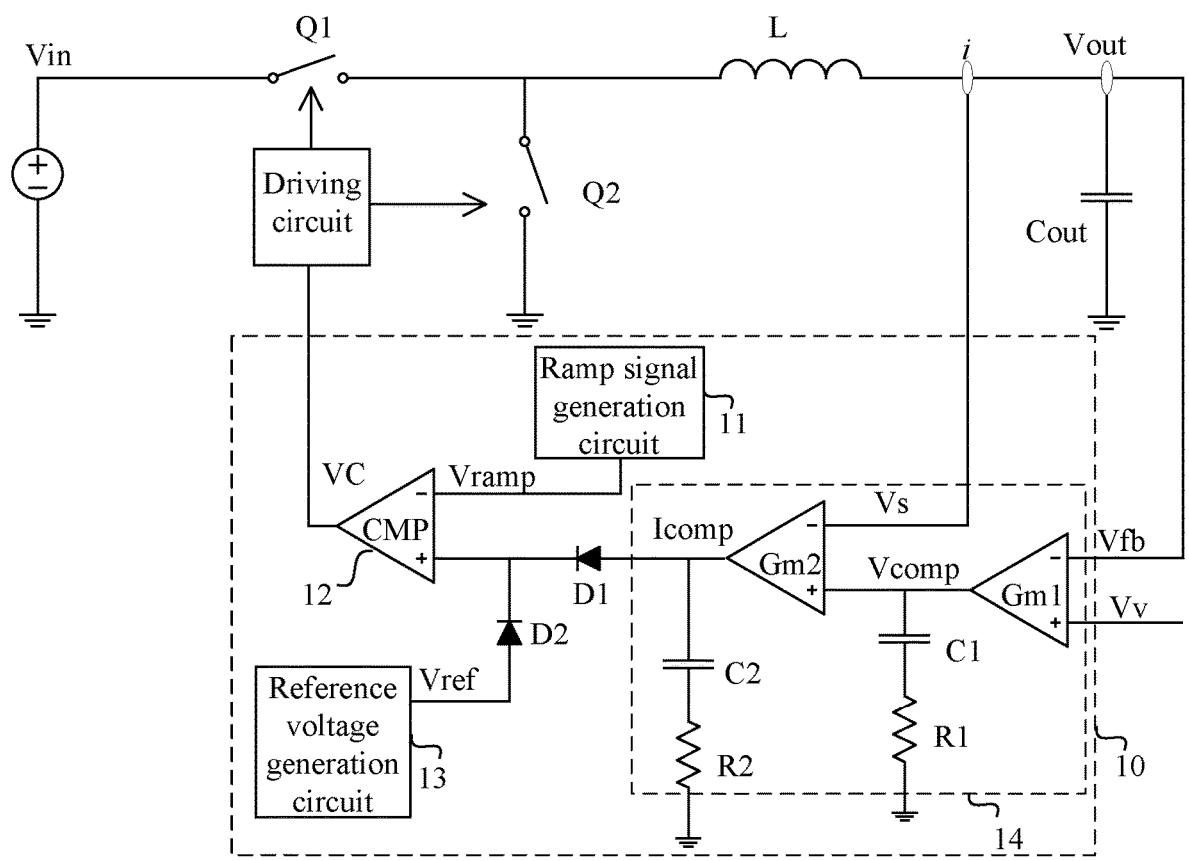
FIG. 1 is a schematic block diagram of an example control circuit for an example switching regulator, in accordance with embodiments of the present invention.

Referring now to FIG. 1, shown is a schematic block diagram of an example control circuit for an example switching regulator, in accordance with embodiments of the present invention. In this particular example, the switching regulator is a buck circuit, and can include power switch Q1, power switch Q2, inductor L, and output capacitor Cout. An input port of the buck circuit may receive input voltage Vin, and an output port can connect to a load. In this example, control circuit 10 for the switching regulator can include ramp signal generation circuit 11, control signal generation circuit 12, reference voltage generation circuit 13, and loop compensation circuit 14. Control circuit 10 can cut off the inner current loop under a light load before the bandwidth of the inner current loop is significantly reduced, thereby avoiding the problem of mutual interference between the inner current loop and the outer voltage loop.

Ramp signal generation circuit 11 can generate ramp signal Vramp. In a first state, a slope of ramp signal Vramp is constant; that is, ramp signal Vramp rises with a first slope. In a second state, ramp signal Vramp rises with the first slope when control signal VC for controlling switching states of the power switches is active, and rises with a second slope when control signal VC is inactive, where the first slope is greater than the second slope. In this example, a peak value of ramp signal Vramp can be fixed at a peak threshold. For example, the slope of ramp signal Vramp can be related to a difference between inductor current sampling signal Vs that characterizes inductor current "i" and voltage compensation signal Vcomp generated by loop compensation circuit 14.

Control signal generation circuit 12 can generate control signal VC for providing to a driving circuit, thereby controlling switching states of the power switches. In the first state, control signal VC can be generated according to loop feedback signal Icomp generated by loop compensation circuit 14 through a dual closed-loop control loop. In the second state, the inner current loop can essentially be disconnected from the switching regulator, and control signal VC can be generated according to reference voltage Vref. For example, in the first state, control signal VC may be generated according to ramp signal Vramp and loop feedback signal Icomp, and in the second state, control signal VC can be generated according to ramp signal Vramp and reference voltage Vref.

Control signal generation circuit 12 can include comparator CMP. An inverting input terminal of comparator CMP may receive ramp signal Vramp, and a non-inverting input terminal of comparator CMP may receive loop feedback signal Icomp or reference voltage Vref generated by reference voltage generation circuit 13. In this example, control signal generation circuit 12 can also include diodes D1 and D2, in order to realize the selection of loop feedback signal Icomp or reference voltage Vref. An anode of diode D1 may receive loop feedback signal Icomp, and a cathode of diode D1 can connect to the non-inverting input terminal of comparator CMP. An anode of diode D2 may receive reference voltage Vref, and a cathode of diode D2 can connect to the non-inverting input terminal of comparator CMP. In this way, the greater of loop feedback signal Icomp and reference voltage Vref can be selected for comparison against ramp signal Vramp.

Reference voltage generation circuit 13 can generate reference voltage Vref according to a voltage conversion ratio that represents the ratio of output voltage Vout to input voltage Vin of the switching regulator. In one example, reference voltage Vref can be directly generated according to the voltage conversion ratio. In another example, reference voltage Vref can be generated according to the voltage conversion ratio and a difference between inductor current sampling signal Vs and voltage compensation signal Vcomp.

Loop compensation circuit 14 can include a voltage compensation circuit and a current compensation circuit. The voltage compensation circuit may receive output voltage feedback signal Vfb characterizing output voltage Vout, and voltage reference signal Vv characterizing the desired output voltage, and may generate voltage compensation signal Vcomp. In this example, the voltage compensation circuit can include transconductance amplifier Gm1 and a compensation network including capacitor C1 and resistor R1 connected in series between an output terminal of transconductance amplifier Gm1 and a ground terminal. An inverting input terminal of transconductance amplifier Gm1 may receive output voltage feedback signal Vfb and a non-inverting input terminal of transconductance amplifier Gm1 may receive voltage reference signal Vv. Capacitor C1 can be charged or discharged by transconductance amplifier Gm1 based on the error between output voltage feedback signal Vfb and voltage reference signal Vv, such that voltage compensation signal Vcomp can be generated to maintain output voltage feedback signal Vfb to be equal to voltage reference signal Vv. Those skilled in the art will recognize that the voltage compensation circuit can also be realized by using other circuits or elements, such as a differential amplifier circuit.

The current compensation circuit may receive inductor current sampling signal Vs representing inductor current "i," and voltage compensation signal Vcomp, in order to generate inductor current compensation signal Icomp. In this example, the current compensation circuit can include transconductance amplifier Gm2 and a compensation network including capacitor C2 and resistor R2 connected in series between an output terminal of transconductance amplifier Gm2 and the ground terminal. Transconductance amplifier Gm2 can include a non-inverting input terminal for receiving voltage compensation signal Vcomp and an inverting input terminal for receiving inductor current sampling signal Vs. Capacitor C2 can be charged or discharged by transconductance amplifier Gm2 based on the error between voltage compensation signal Vcomp and inductor current sampling signal Vs, such that current compensation signal Icomp can be generated to maintain inductor current sampling signal Vs to be equal to be voltage compensation signal Vcomp. Those skilled in the art will recognize that the current compensation circuit can also be realized by using other circuits or elements, such as a differential amplifier circuit. In this example, current compensation signal Icomp may be used as the loop feedback signal for comparison against ramp signal Vramp generated by ramp signal generation circuit 11, in order to generate control signal VC in the first state.

Figure 2:
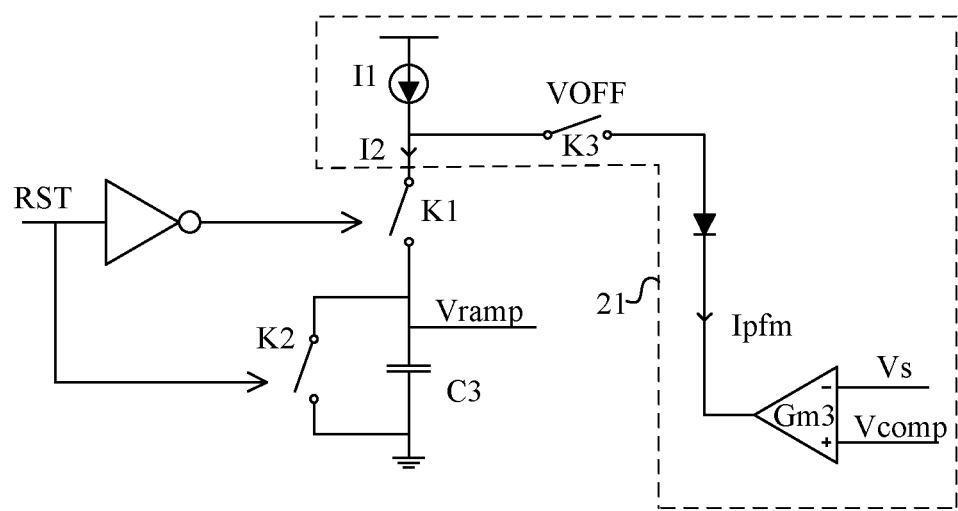
FIG. 2 is a schematic block diagram of an example ramp signal generation circuit of the control circuit, in accordance with embodiments of the present invention.

Referring now to FIG. 2, shown is a schematic block diagram of an example ramp signal generation circuit of the control circuit, in accordance with embodiments of the present invention. In this example, ramp signal generation circuit 11 can generate ramp signal Vramp by charging or discharging capacitor C3 via current source circuit 21, and adjust current I2 generated by current source circuit 21 according to the difference between inductor current sampling signal Vs and voltage compensation signal Vcomp when control signal VC is inactive. In some embodiments, ramp signal generation circuit 11 can include current source circuit 21 and capacitor C3. For example, current source circuit 21 can connect to capacitor C3 through switch K1, capacitor C3 and switch K2 can connect in parallel between switch K1 and the ground terminal, and ramp signal Vramp may be generated at the non-grounded terminal of capacitor C3.

In this example, switches K1 and K2 can be controlled by reset signal RST. For example, switch K2 may be directly controlled by reset signal RST, and switch K1 can be controlled by an inverted version of reset signal RST. In this example, reset signal RST may be activated when a peak value of ramp signal Vramp rises to peak threshold Vg, and can be active for a relatively short period. Thus, reset signal RST can be active with a narrow pulse when the peak value of ramp signal Vramp rises to peak threshold Vg, in order to clear ramp signal Vramp across capacitor C3, such that the peak value of ramp signal Vramp is fixed at peak threshold Vg.

Current source circuit 21 can include current source I1 and transconductance amplifier Gm3. In this example, current source I1 can generate fixed current I1, and transconductance amplifier Gm3 can generate error amplification current Ipfm according to the error between inductor current sampling signal Vs and voltage compensation signal Vcomp, in order to increase or decrease fixed current I1 to generate current I2. A non-inverting input terminal of transconductance amplifier Gm3 may receive voltage compensation signal Vcomp, and an inverting input terminal of transconductance amplifier Gm3 may receive inductor current sampling signal Vs.

Current source circuit 21 also can include switch K3 connected between an output terminal of current source I1 and an output terminal of transconductance amplifier Gm3. In this particular example, switch K3 can be turned on during the inactive state of control signal VC, such that current I2 generated by current source circuit 21 may only be adjusted during the inactive state of control signal VC by the difference between inductor current sampling signal Vs and voltage compensation signal Vcomp. Those skilled in the art will recognize that ramp signal generation circuit 11 can also be realized by other circuits or elements, as long as current I2 can be adjusted according to the difference between inductor current sampling signal Vs and voltage compensation signal Vcomp during the inactive state of the control signal.

Figure 3:
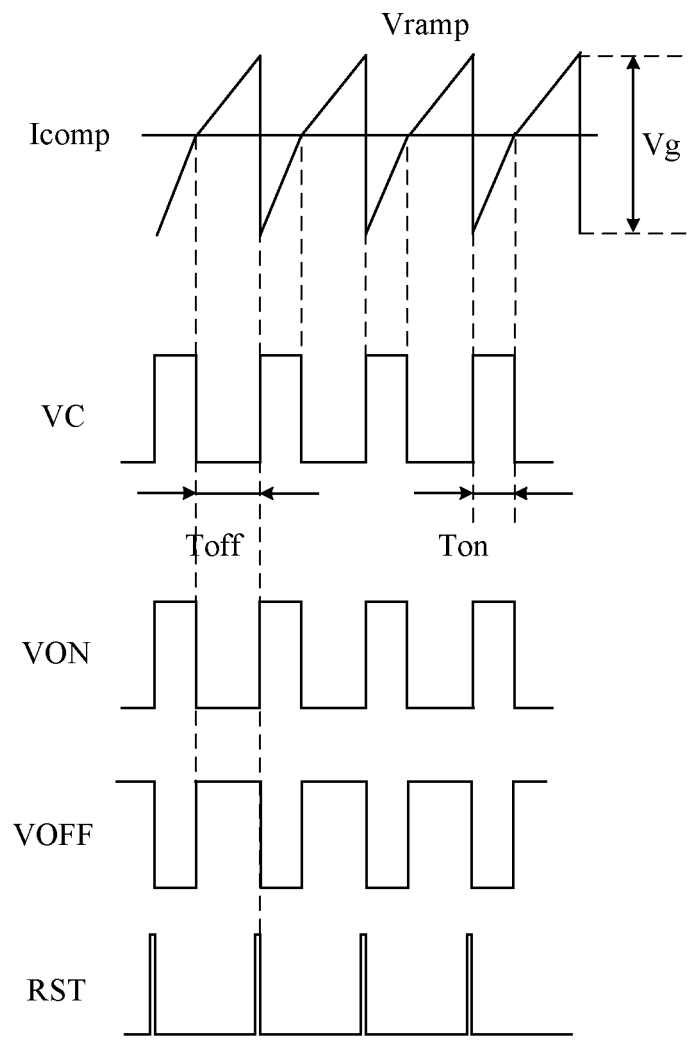
FIG. 3 is a waveform diagram of example operation of the control circuit, in accordance with embodiments of the present invention.

Referring to FIG. 3, shown is a waveform diagram of example operation of the control circuit, in accordance with embodiments of the present invention. The operation process of the ramp signal generation circuit will be described with reference to FIGS. 2 and 3. When control signal VC is active (e.g., during turn-on time Ton), switch K1 can be turned on, and switches K2 can be turned off. During this period, current source I1 can charge capacitor C3, and ramp signal Vramp across capacitor C3 may rise with a normal slope (e.g., the first slope). When control signal VC is inactive (e.g., during turn-off time Toff), switch K1 can be turned on, switch K2 may be turned off, and switch K3 can be turned on. In a first case (not shown in FIG. 3), the system may operate in a voltage and current dual closed-loop control, and the difference between inductor current sampling signal Vs and voltage compensation signal Vcomp can be relatively close to zero. Thus, error amplification current Ipfm can be zero, and current source I1 that charges capacitor C3 may not be changed. Therefore, Vramp signal Vramp can also rise with the first slope.

In a second case, the system may operate in a single voltage loop control since the inner current loop is cut off. Then, the difference between inductor current sampling signal Vs and voltage compensation signal Vcomp may not be zero. Accordingly, error amplification current Ipfm is greater than zero, such that it may offset the current generated by current source I1, which can the current generated by current source I1 to charge capacitor C3. Thus, ramp signal Vramp across capacitor C3 may rise with a smaller slope (e.g., the second slope). Since peak threshold Vg is constant, the period during which ramp signal Vramp rises from zero to peak threshold Vg can become longer, thereby decreasing the switching frequency of the switching regulator.

Figure 4:
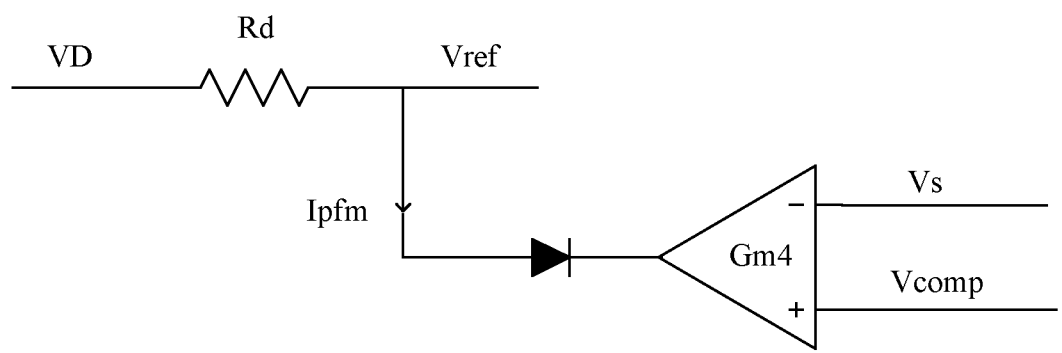
FIG. 4 is a schematic block diagram of an example reference voltage generation circuit of the control circuit, in accordance with embodiments of the present invention.

Referring now to FIG. 4, shown is a schematic block diagram of an example reference voltage generation circuit of the control circuit, in accordance with embodiments of the present invention. In this example, reference voltage generation circuit 13 can generate reference voltage Vref according to voltage conversion ratio VD, which may represent the ratio between output voltage Vout and input voltage Vin of the switching regulator. In some embodiments, reference voltage Vref is set to be K×VD. That is, reference voltage Vref can be proportional to voltage conversion ratio VD. In other embodiments, reference voltage Vref is set to have a linear relationship with voltage conversion ratio VD, and also to have a linear relationship with the difference between inductor current sampling signal Vs and voltage compensation signal Vcomp. That is, reference voltage Vref can be set to be K×VD−M×(Vs−Vcomp), where K and M are coefficients.

In the following description, peak threshold Vg is set to be 1, e.g., so K<1. In this particular example, reference voltage generation circuit 13 can include resistor Rd and transconductance amplifier Gm4. For example, a first terminal of resistor Rd may receive voltage conversion ratio VD, and reference voltage Vref can be generated at a second terminal of resistor Rd. The resistance of resistor Rd can be determined according to particular requirements. An output terminal of transconductance amplifier Gm4 can be coupled to the second terminal of resistor Rd, and may generate error amplification current Ipfm according to the difference between inductor current sampling signal Vs and voltage compensation signal Vcomp. Thus, the current flowing through resistor Rd can be changed, thereby adjusting reference voltage Vref. In this example, a non-inverting input terminal of transconductance amplifier Gm4 may receive voltage compensation signal Vcomp, and an inverting input terminal may receive inductor current sampling signal Vs. Based on the structure of reference voltage generation circuit 13 described herein, coefficient M=kGm4×Rd, where kGm4 is the gain of transconductance amplifier Gm4.

Referring to both FIGS. 1 and 4, the operation principle of the control circuit can be described as follows. In this example, Vref=K×VD−M×(Vs−Vcomp), and it should be understood that Vref=K×VD can also be applied in certain embodiments. In the first state (e.g., under a normal load and the inductor current is continuous), the switching regulator may operate under the dual closed-loop control, and loop feedback signal Icomp corresponds to duty ratio D, where duty ratio D is equal to Vout/Vin determined by the characteristic of the buck circuit under this state. Also, the difference between inductor current sampling signal Vs and voltage compensation signal Vcomp can be close to zero under this dual closed-loop control. Therefore, reference voltage Vref=K×VD(K<1), which is less than loop feedback signal Icomp. Thus, diode D1 can conduct, and diode D2 can be turned off, whereby the switching regulator operates under the dual closed-loop control. Since Vcomp=Vs, error amplifier current Ipfm equals to zero, and thus ramp signal Vramp may rise with the first slope during both turn-on time Ton and turn-off time Toff. In addition, it should be understood that reference voltage Vref can also be directly set to K×VD, which may not affect the operation of the system.

Loop feedback signal Icomp may gradually decrease as the load becomes lighter. When loop feedback signal Icomp decreases to be less than reference voltage Vref, the system can enter the second state. In the second state, diode D1 can be turned off and diode D2 can conduct, such that the inner current loop is cut off, and then reference voltage Vref, instead of loop feedback signal Icomp, can be selected to be compared against ramp signal Vramp. Therefore, the difference between inductor current sampling signal Vs and voltage compensation signal Vcomp may not be zero, and thus error amplifier current Ipfm can be greater than zero, and current I2 may be adjusted when switch K3 is turned on during turn-off time Toff.

Thus, ramp signal Vramp can rise with the first slope during turn-on time Ton, and ramp signal Vramp may rise with the second slope that is smaller than the first slope during turn-off time Toff. Since reference voltage Vref=K×VD−M×(Vs−Vcomp), reference voltage Vref may be smaller as the load becomes lighter, such that turn-on time Ton can be decreased, and the ripple of the output current and output voltage can also be reduced. In addition, since ramp signal Vramp has a smaller second slope during turn-off time Toff, the time for ramp signal Vramp to reach peak threshold Vg increases, thereby decreasing the switching frequency under the light load by adjusting turn-off time Toff. In addition, the inner current loop can be cut off during this period, thereby avoiding instability of the system caused by the decrease of the bandwidth of the inner current loop. It should be understood that, when reference voltage Vref=K×VD, since voltage conversion ratio VD is always equal to Vou/Vin, reference voltage Vref may not change with the change of the load. Thus, turn-on time Ton can be constant, and turn-off time Toff may be adjusted to decrease the switching frequency, thereby maintaining output voltage Vout.

In particular embodiments, the switching regulator may operate in voltage and current dual closed-loop control under a normal load, and the inner current loop can be cut off under a light load before the bandwidth of the inner current loop is significantly reduced. In this way, mutual interference between the inner current loop and the outer voltage loop can be substantially avoided, and ripple of the output current and output voltage can be reduced, by decreasing the turn-on time of the main power switch and the switching frequency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching regulator, the control circuit comprising:
   a) a control signal generation circuit configured to generate a control signal for controlling switching states of power switches in the switching regulator;
   b) wherein, in a first state of the switching regulator, the control signal is generated in accordance with a loop feedback signal that is generated based on a difference between an output voltage and a desired output voltage;
   c) wherein, in a second state of the switching regulator, the control signal is generated in accordance with a reference voltage by disabling the loop feedback signal; and
   d) a ramp signal generation circuit configured to generate a ramp signal, wherein the control signal is generated by comparing the ramp signal against the loop feedback signal in the first state, and by comparing the ramp signal against the reference voltage in the second state.

2. The control circuit of claim 1, wherein the reference voltage is generated according to a voltage conversion ratio that represents a ratio of an output voltage to an input voltage of the switching regulator.

3. The control circuit of claim 2, wherein the reference voltage is proportional to the voltage conversion ratio.

4. The control circuit of claim 1, wherein:
   a) the reference voltage is generated according to a voltage conversion ratio that represents a ratio of an output voltage to an input voltage of the switching regulator, and a difference between an inductor current sampling signal and a voltage compensation signal; and
   b) the voltage compensation signal is generated according to a difference between the output voltage and the desired output voltage.

5. The control circuit of claim 4, wherein the reference voltage has a linear relationship with the voltage conversion ratio, and also with a difference between the inductor current sampling signal and the voltage compensation signal.

6. The control circuit of claim 1, wherein:
   a) in the first state, the ramp signal rises with a first slope during each switching period; and
   b) in the second state, the ramp signal rises with the first slope when the control signal is active, and the ramp signal rises with a second slope when the control signal is inactive, in order to decrease a switching frequency of the switching regulator.

7. The control circuit of claim 6, wherein the first slope is greater than the second slope.

8. The control circuit of claim 1, wherein:
   a) a peak value of the ramp signal is constant; and
   b) a slope of the ramp signal is adjusted according to a difference between a voltage compensation signal that is generated based on a difference between a voltage feedback signal for characterizing an output voltage and a voltage reference signal for characterizing the desired output voltage and an inductor current sampling signal that characterizes an inductor current of the switching regulator when the control signal is inactive.

9. The control circuit of claim 1, further comprising a loop compensation circuit configured to generate the loop feedback signal, the loop compensation circuit comprising:
   a) a voltage compensation circuit configured to generate a voltage compensation signal according to a difference between the output voltage and the desired output voltage; and
   b) a current compensation circuit configured to generate the loop feedback signal according to a difference between an inductor current sampling signal and the voltage compensation signal.

10. The control circuit of claim 1, wherein:
   a) the ramp signal generation circuit comprises a current source circuit configured to generate an output current to charge a first capacitor;
   b) the output current is a first current in the first state; and
   c) the output current is the first current during a turn-on time and is a second current during a turn-off time in the second state.

11. The control circuit of claim 10, wherein the first capacitor discharges to zero when the ramp signal reaches the peak threshold, such that the ramp signal is generated across the first capacitor.

12. The control circuit of claim 10, wherein the current source circuit comprises:
   a) a first current source configured to generate the first current that is constant; and
   b) a first transconductance amplifier configured to draw current from the first current according to a difference between the inductor current sampling signal and the voltage compensation signal, thereby adjusting the output current generated by the current source circuit.

13. The control circuit of claim 12, wherein the current source circuit further comprises a switch coupled between an output terminal of the first current source and an output terminal of the first transconductance amplifier, and being turned on when the control signal is inactive.

14. The control circuit of claim 1, wherein the control signal generation circuit further comprises:
   a) a first diode having an anode for receiving the loop feedback signal, and a cathode coupled to one input terminal of the control signal generation circuit; and
   b) a second diode having an anode for receiving the reference signal, and a cathode coupled to the cathode of the first diode.

15. A method of controlling a switching regulator, the method comprising:
   a) generating, in a first state of the switching regulator, a control signal for controlling switching states of power switches in the switching regulator, in accordance with a loop feedback signal that is generated based on a difference between an output voltage and a desired output voltage;
   b) generating, in a second state of the switching regulator, the control signal in accordance with a reference voltage by disabling the loop feedback signal;
   c) generating, in the first state, the control signal by comparing a ramp signal against the loop feedback signal; and
   d) generating, in the second state, the control signal by comparing the ramp signal against the reference voltage.

16. The method of claim 15, wherein the reference voltage is generated according to a voltage conversion ratio that represents a ratio of an output voltage to an input voltage of the switching regulator.

17. The method of claim 15, wherein the reference voltage is generated according to a voltage conversion ratio that represents a ratio of an output voltage to an input voltage of the switching regulator, and a difference between an inductor current sampling signal and a voltage compensation signal that is generated according to a difference between the output voltage and the desired output voltage.

18. The method of claim 15, wherein:
   a) in the first state, the ramp signal rises with a first slope during each switching period;

b) in the second state, the ramp signal rises with the first slope when the control signal is active, and the ramp signal rises with a second slope when the control signal is inactive, in order to decrease a switching frequency of the switching regulator; and
c) the first slope is greater than the second slope.

* * * * *